(12) United States Patent
Wolff (10) Patent No.: US 6,566,819 B2
(45) Date of Patent: May 20, 2003

(54) TOUCH OPERATED CONTROL SYSTEM FOR ELECTRICAL DEVICES

(76) Inventor: Gregory A. Wolff, 142 Seventy Acres Rd., West Redding, CT (US) 06896

( * ) Notice: Subject to any disclaimer, the term of this patent is extended or adjusted under 35 U.S.C. 154(b) by 0 days.

(21) Appl. No.: 09/825,532

(22) Filed: Apr. 2, 2001

(65) Prior Publication Data

US 2001/0045897 A1 Nov. 29, 2001

Related U.S. Application Data

(60) Provisional application No. 60/194,055, filed on Apr. 3, 2000.

(51) Int. Cl.[7] .............................................. H05B 37/02
(52) U.S. Cl. .......................... 315/149; 315/56; 315/58; 315/360; 323/904; 307/116; 307/117
(58) Field of Search .......................... 315/149, 56, 58, 315/360; 323/904; 307/116, 117

(56) References Cited

U.S. PATENT DOCUMENTS

| | | | |
|---|---|---|---|
| 3,748,532 A | | 7/1973 | Rosenbaum ................ 315/362 |
| 4,038,561 A | | 7/1977 | Lorenz ........................ 307/141 |
| 4,109,231 A | | 8/1978 | Krouse ....................... 338/200 |
| 4,211,959 A | * | 7/1980 | Deavenport et al. ........ 315/362 |
| 4,490,652 A | | 12/1984 | Dilly ........................... 307/116 |
| 4,632,490 A | * | 12/1986 | Von Gunten ................ 339/154 |
| 4,668,876 A | | 5/1987 | Skarman ..................... 307/116 |
| 4,668,877 A | | 5/1987 | Kunen ........................ 307/116 |
| 4,701,676 A | * | 10/1987 | Gibson ....................... 315/362 |
| 4,924,109 A | | 5/1990 | Weber ........................ 307/126 |
| 5,023,522 A | | 6/1991 | Mansour .................... 315/291 |
| 5,066,898 A | * | 11/1991 | Miller et al. ................ 315/362 |
| 5,212,672 A | | 5/1993 | Loisch et al. ............... 368/79 |
| 5,258,656 A | * | 11/1993 | Pawlick ...................... 307/141 |
| 5,485,058 A | * | 1/1996 | Watson et al. .............. 315/194 |
| 5,489,891 A | * | 2/1996 | Diong et al. ................ 340/567 |
| 5,663,633 A | * | 9/1997 | Kahn et al. ................. 323/218 |
| 6,138,241 A | | 10/2000 | Eckel et al. ................ 713/300 |

FOREIGN PATENT DOCUMENTS

| | | |
|---|---|---|
| GB | 2128822 | 5/1984 |
| GB | 2239742 | 7/1991 |

OTHER PUBLICATIONS

International Search Report, Oct. 2, 2001.

* cited by examiner

Primary Examiner—Don Wong
Assistant Examiner—Tuyet T. Vo
(74) Attorney, Agent, or Firm—Cummings & Lockwood (57) ABSTRACT

A touch operated control system is provided that advantageously provides enhanced functionality, including a programmable timer that sets a light coupled to the dimmer to OFF after a predetermined period of time. The control system generally includes a conductive housing provided with a power receptacle, a power switch, a fuse, and a printed circuit board mounted within the housing. The printed circuit board includes switching circuitry by means of a programmed integrated circuit operationally connected to the housing, and a timer is operationally connected to the switching circuitry. By touching the housing, the switching circuitry is activated to automatically connect or remove power to or from the power receptacle. The sequence and duration of the touch activation function varies the system response to provide enhanced control, functionality and flexibility. The disclosed control systems continuously monitor the status of the connected electrical device, providing a visual indication of the device's operative condition.

38 Claims, 7 Drawing Sheets

TOUCH OPERATED CONTROL SYSTEM FOR ELECTRICAL DEVICES

CROSS REFERENCE TO RELATED APPLICATIONS

The present application claims the benefit of a co-pending provisional application entitled "Touch Operated Light Dimmer with Timer," filed on Apr. 3, 2000 and assigned Ser. No. 60/194,055, the contents of which are hereby incorporated by reference in their entirety.

BACKGROUND OF THE DISCLOSURE

1. Technical Field

The present disclosure relates generally to control systems and control mechanisms for electrical devices, e.g., lights, radios, appliances and the like. More particularly, the present disclosure relates to light control/dimmer systems that may are advantageously touch operated. Preferred light control/dimmer systems according to the present disclosure include a programmable timer that may be used to control operation of an electrical device, e.g., a light, that is attached thereto, e.g., by switching the electrical device to an "OFF" position after a predetermined period of time.

2. Background Art

With the widespread use of electrical devices in homes and businesses, attention has been devoted to improving the operation and enhancing the convenience associated with such devices. Devices have been developed to facilitate intensity control, e.g., dimming systems, and to provide timing systems to permit preset control of the electronic device. Thus, for example, touch control lamp systems have been developed that permit lamp operation through direct contact with the lamp base. Similarly, timing systems have been developed that permit users to select operational periods for electrical devices. The patent literature describes many of the aforementioned developments in the art.

For example, U.S. Pat. No. 3,748,532, issued on Jul. 24, 1973 to Saul Rosenbaum, describes a removable dimmer attachment for connecting an incandescent lamp to a source of alternating current. U.S. Pat. No. 4,038,561, issued on Jul. 26, 1977 to Michael Lorenz, describes controlled light and music in a child's room during those periods when the child has retired for a night's sleep or when it is time to awaken to a new day's activities. U.S. Pat. No. 4,109,231, issued on Aug. 22, 1978 to Robert S. Krouse, describes a portable switch and dimmer control console for conveniently controlling a plurality of electrical devices and variably controlling the intensity of at least one fixture in a single conveniently designed self-contained portable unit.

In addition, U.S. Pat. No. 4,490,625, issued on Dec. 25, 1984 to David A. Dilly, describes a dimmer control switch assembly for activating an incandescent lamp bulb or similar controlled appliance or device to assume any of three different illumination intensity states and an OFF state, wherein a Rubik's cube modified to include two magnets forms the activation member. U.S. Pat. No. 4,668,876, issued on May 26, 1987 to John S. Skarman, describes a touch control lamp system including a touch control dimmer switch adapted to be plugged into a standard electrical household outlet, and a lamp having a male electrical plug adapted to plug into the touch control switch. U.S. Pat. No. 4,668,877, issued on May 26, 1987 to Scott M. Kunen, describes an electrical power control device which operates by touch and which does not require a wired electrical connection to a lamp or appliance.

U.S. Pat. No. 4,924,109, issued on May 8, 1990 to Harold J. Weber, describes an electrical timer which controls the ON-time of a touch operated light bulb circuit hooked up to a power source by way of an ordinary power switch. U.S. Pat. No. 5,023,522, issued on Jun. 11, 1991 to George A. Mansour, describes a dimmer for use as a support for a lamp. U.S. Pat. No. 5,212,672, issued on May 18, 1993 to Julius A. Loisch et al., describes a timing control apparatus for selectively actuating at least one remote device at a selected future time, by generating a plurality of clock pulses of a known time duration at a selected time, and by counting the clock pulses to gradually increase the intensity of electrical current in response to the clock pulses counted, from an initial state to full intensity over time.

Additional teachings from the patent art include U.S. Pat. No. 5,258,656, issued on Nov. 2, 1993 to William F. Pawlick, which describes an electronic ON/OFF timer apparatus and method having predetermined time delay intervals. U.S. Pat. No. 5,489,891, issued on Feb. 6, 1996 to Chong K. Diong et al., describes a control for electrically energizing an illumination means. Great Britain Patent document 2,128, 822 A, published on May 2, 1984, describes a pre-set dimmer switch. Great Britain Patent document 2,239,742 A, published on Jul. 10, 1991, describes a plug-in sensor and switch assembly which is responsive to the presence or movement of a person in the vicinity of the device.

The disclosures of the above-identified patents/publications provide background teachings with respect to the systems of the present disclosure and are hereby incorporated by reference in their entireties.

Despite the teachings to date, however, control systems and devices are needed to further enhance convenience and user control with respect to electric appliances, e.g., lights, lamps and the like. In particular, improved systems and devices for facilitating intensity control, for monitoring system functionality, and/or for facilitating timer control and functionality are needed.

SUMMARY OF THE DISCLOSURE

In view of the foregoing, it is an object of the present disclosure to provide a touch operated control system for electric devices/appliances, e.g., lights, lamps, audio equipment and the like. It is also an object of the present disclosure to provide a touch operated control system with programmable timing functionality. It is an additional object of the present disclosure to provide a touch operated control system that monitors the operational state of an electric device/appliance attached thereto. It is another object of the present disclosure to provide a touch operated control system that is responsive to predetermined pattern(s) and/or sequence(s) of contact to function in predetermined manners. It is a further object of the present disclosure to provide a touch operated control system that is relatively inexpensive to manufacture/operate, dependable and fully effective in accomplishing its intended purposes. Additional objects and enhanced functionalities associated with the present disclosure will be apparent from the descriptions and figures that follow.

In accord with these objects, a touch operated system for use with electric devices/appliances is provided. In a preferred embodiment of the present disclosure, a touch operated light control system is provided. Preferred light control systems according to the present disclosure provide advantageous functionalities, e.g., dimming functionality, timing functionality, and monitoring functionality with respect to a light/lamp powered thereby. In a preferred embodiment of the present disclosure, a touch operated light dimmer system is provided that includes an integral programmable timer that is adapted to set a light attached to the dimming device to an OFF position after a predetermined period of time.

One example of a touch operated light dimmer apparatus according to the present disclosure includes a housing. The housing has a front portion, a rear portion, and a base. The front portion of the housing includes holes defined therein for receiving/mounting visual indicating means, such as light emitting diodes (LEDs). The rear portion of the housing typically includes a plurality of holes defined therein for receiving/mounting elements such as a power receptacle, a power switch, a fuse, and plural fastening means, such as screws.

A power receptacle is generally provided for facilitating electric transmission to an electrical device, such as a light, a lamp, an audio device or the like. A power switch, while not required, may be used for positively providing power to the power receptacle. Fastening means are typically utilized to fasten the front portion of the housing to the rear portion of the housing. A printed circuit board is mounted inside the housing. The printed circuit board generally includes switching circuitry, such as transistor circuitry and/or a programmed integrated circuit, and a timer that is operationally connected to the housing. The switching circuitry is preferably touch activated so as to supply power in a predetermined fashion to the power receptacle when the housing (and/or other touch activated region) is touched. The housing is preferably formed of conductive material, such as metallic material or metalized plastic.

The switching circuitry is generally adapted to conduct the requisite amount of electrical voltage to the power receptacle when the housing is touched. Also typically mounted on the printed circuit board are visual indicating means, such as LEDs. The visual indicating means may include an ON/OFF LED to indicate when the touch operated light dimmer is ON or OFF. The visual indicating means may also include a STANDBY LED to indicate when the touch operated light dimmer is in STANDBY mode. The STANDBY mode is configured to sense when a light or lamp connected to the dimmer has been turned OFF using a switch located on the lamp, or if a light bulb has burned out on a light or lamp connected to the dimmer. This is achieved by always sending a slight amount of voltage to the lamp, even when the dimmer is set to full dim down. Such a voltage is not enough to make the light glow, but is enough to allow the dimmer to advantageously sense a load, or completed circuit. When the lamp is switched OFF at the lamp, the load is missing, the circuit is broken, and the dimmer goes into STANDBY mode. The visual indicating means may also include LEDs which indicate that the touch operated light dimmer is in TIMER mode and is on for thirty minutes, sixty minutes, ninety minutes, etc.

In a preferred embodiment of the present disclosure, operation of the disclosed touch operated control system, e.g., a touch operated light dimmer, typically involves the following operative steps. Initially, a standard AC power connector associated with the touch operated light dimmer via means of a power line is plugged into a standard household outlet, rated at 120 V, 60 Hz, alternating current, or 210 V, 50 Hz international, alternating current. The touch operated light dimmer automatically senses 50 Hz or 60 Hz power, and advantageously works appropriately for either standard current. The household outlet may always be receiving power from an external source. Alternatively, the household outlet may intermittently receive power from an external source via means of a remote switch, such as a wall mounted switch or the like. An electrical device, such as a lamp or light, is plugged into the power receptacle of the touch operated light dimmer. Typically, such a light or lamp includes an integrated light switch.

If the touch operated light dimmer is receiving power from a household outlet, and the touch operated light dimmer includes a power switch and the power switch is turned ON, power is provided to the light/lamp that is plugged into the touch operated light dimmer, the ON/OFF LED on the touch operated light dimmer turns ON to indicate that the touch operated light dimmer is ON, and the STANDBY LED on the touch operated light dimmer turns ON to indicate that the touch operated light dimmer is in STANDBY mode. If the power switch on the light/lamp is subsequently turned ON, the light/lamp attached to the dimmer dims up to full brightness within a predetermined short period of time, preferably 1.5 seconds, the ON/OFF LED on the dimmer remains ON to indicate that the dimmer is ON, and the STANDBY LED on the dimmer turns OFF to indicate that the dimmer is not in STANDBY mode. If the power switch on the light/lamp is ON and is then subsequently turned OFF and the power switch on the dimmer remains ON, the light/lamp attached to the dimmer turns OFF immediately, the ON/OFF LED on the dimmer remains ON to indicate that the dimmer is ON, and the STANDBY LED on the dimmer turns ON to indicate that the dimmer is in STANDBY mode.

If the power switch on the light is ON, the power switch on the dimmer remains ON, and a light bulb attached to the light/lamp burns out, the light/lamp attached to the dimmer turns OFF immediately, the ON/OFF LED on the dimmer remains ON to indicate that the dimmer is ON, and the STANDBY LED on the dimmer turns ON to indicate that the dimmer is in STANDBY mode. If the power switch on the light/lamp is ON and the power switch on the dimmer is subsequently turned OFF, the light/lamp attached to the dimmer turns OFF immediately, the ON/OFF LED on the dimmer turns OFF to indicate that the dimmer is OFF, and the STANDBY LED on the dimmer remains OFF to indicate that the dimmer is not in STANDBY mode.

If the power receptacle intermittently receives power from an external source via means of a remote switch, such as a wall mounted switch or the like, the above described functional variations remain consistent in circumstances where the remote switch is in the ON position. If the remote switch is turned to the OFF position, however, no power is received from the power receptacle, no power is received by the dimmer, no power is received by the light/lamp attached to the dimmer, and the associated dimmer LEDs and the light attached to the dimmer immediately turn OFF. If the remote switch is subsequently turned to the ON position, the dimmer and the light/lamp attached to the dimmer will again receive power, and the associated dimmer LEDs and the light attached to the dimmer will illuminate accordingly. For example, if the remote switch is turned to the ON position when the power switch on the light is in the ON position and the power switch on the dimmer is in the ON position, the light attached to the dimmer will dim up to full brightness within the same predetermined short period of time, i.e., 1.5 seconds, the ON/OFF LED on the dimmer turns ON to indicate that the dimmer is ON, and the STANDBY LED on the dimmer remains OFF to indicate that the dimmer is not in STANDBY mode.

If the touch operated light dimmer is receiving power from a household outlet, and the touch operated light dimmer does not include a power switch, power is provided to the light/lamp that is plugged into the touch operated light dimmer, and if the light/lamp is turned "off" (or has a burned out bulb), the ON/OFF LED on the dimmer turns ON to indicate that the touch operated light dimmer is ON, and the STANDBY LED on the dimmer turns ON to indicate that the touch operated light dimmer is in STANDBY mode. If the power switch on the light is subsequently turned ON, the light attached to the dimmer dims up to full brightness within the above described predetermined short period of time, i.e., 1.5 seconds, the ON/OFF LED on the dimmer remains ON to indicate that the touch operated light dimmer is ON, and the STANDBY LED on the dimmer turns OFF to indicate that the dimmer is not in STANDBY mode. If the power switch on the light/lamp is ON and is then subsequently turned OFF, the light attached to the dimmer turns OFF immediately, the ON/OFF LED on the dimmer remains ON to indicate that the dimmer is ON, and the STANDBY LED on the dimmer turns ON to indicate that the dimmer is in STANDBY mode.

If the power switch on the light is ON and a light bulb attached to the light/lamp burns out, the light attached to the dimmer immediately turns OFF, the ON/OFF LED on the dimmer remains ON to indicate that the touch operated light dimmer is ON, and the STANDBY LED on the dimmer turns ON to indicate that the dimmer is in STANDBY mode. If the power receptacle on the dimmer intermittently receives power from an external source via means of a remote switch, such as a wall mounted switch or the like, the above-described functional variations remain consistent if the remote switch is in the ON position. If the remote switch is turned to the OFF position, no power is received out of the power receptacle, no power is received by the dimmer, the associated dimmer LEDs and the light/lamp attached to the dimmer immediately turn OFF. If the remote switch is subsequently turned to the ON position, the dimmer and the light attached to the dimmer will again receive power, and the associated dimmer LEDs and the light/lamp attached to the dimmer will illuminate accordingly.

For example, if the remote switch is turned to the ON position when the power switch on the light/lamp is in the ON position, the light attached to the dimmer will dim up to full brightness within the same predetermined short period of time, i.e., 1.5 seconds, the ON/OFF LED on the dimmer turns ON to indicate that the dimmer is ON, and the STANDBY LED on the dimmer remains OFF to indicate that the dimmer is not in STANDBY mode.

In further preferred embodiments according to the present disclosure, touch operated control systems are provided that are advantageously responsive to predetermined pattern(s) and/or sequence(s) of touch activation, i.e., contact by the user, to function in predetermined manners. Thus, in a preferred embodiment, a housing is responsive to touch activation, and functions in one or more predetermined manners in response to "long" versus "short" duration contacts by the user. Internal circuit logic associated with the device advantageously translates the relative contact duration into predetermined actions/inputs, thereby allowing efficient and reliable control of an associated electric device, e.g., a lamp, light or the like.

According to the present disclosure, a control system may be provided wherein, if a user touches the housing for a short period of time (hereinafter called SHORT TOUCH), preferably less than ½ second, the associated light dims up to full brightness within a predetermined short period of time, preferably 1.5 seconds. If the user has programmed a timer setting (as described in greater detail hereinbelow), it is immediately canceled after a SHORT TOUCH is applied to the housing. If the user subsequently applies a SHORT TOUCH to the housing, the light dims down from full brightness and shuts OFF within a predetermined short period of time, preferably 1.5 seconds. In such preferred embodiment, when a SHORT TOUCH is applied to the housing, the light will either dim full up or full down, based on the last function performed, i.e., up, then down, then up, and so on. When a SHORT TOUCH is applied to the housing, the light generally dims up or down in the predetermined short period of time, e.g., 1.5 seconds, and any timer settings are automatically canceled.

If the user touches and holds the housing for an extended period of time (hereinafter referred to as LONG TOUCH), preferably greater than ½ second, the light dims up to full brightness within a predetermined period of time longer than after applying a SHORT TOUCH to the housing, preferably three seconds. If the user discontinues touching the housing before the three seconds necessary to achieve full brightness of the light, the light intensity will remain at the intensity reached during the time the user touched the housing, and no timer setting will be made or cancelled.

If the user touches and holds the housing a predetermined period, e.g., 1.5 seconds, longer than the time (e.g., three seconds) necessary to achieve full brightness of the light, a timer associated with a preferred control system according to the present disclosure is automatically set, e.g., for thirty minutes, and the associated LED activates. If the user continues to hold the housing an additional predetermined period, e.g., 1.5 seconds, the timer is advantageously set for a second predetermined period, e.g., sixty minutes. In such circumstance, the initial LED, e.g., the "thirty minute LED," deactivates, and a second LED ("the sixty minute LED") activates. If the user continues to hold the housing an additional period of time, e.g., 1.5 seconds, the timer is set for a third period of time, e.g., ninety minutes. Accordingly, the sixty minute LED deactivates, and a "ninety minute LED" activates. If the user continues to hold the housing for a predetermined additional period of time, e.g., an additional 1.5 seconds, the timer will preferably begin to repeatedly cycle through the zero, thirty, sixty, and ninety minute time settings. Based on when the user discontinues his/her contact with the housing, the timer will be set for an appropriate period of time, e.g., ranging from 0 minutes to 90 minutes.

Once the timer of the touch operated light dimmer is set to a desired time period, e.g., thirty minutes, sixty minutes, or ninety minutes, the timer begins counting down. In preferred embodiments of the present disclosure, the light dimmer provides a discernible signal that the timer is counting down and advantageously provides a further discernible signal as the timer approaches preset points in its "countdown" cycle. For example, if the thirty minute timer is set, the thirty minute LED continuously flashes at a predetermined frequency or rate as the countdown commences. Thereafter, as the countdown approaches zero time, e.g., after twenty-eight minutes, the thirty minute LED preferably continuously flashes at an increased rate until seven seconds remain. When seven seconds remain, the light dims down to 25 percent of the initial intensity and remains at that level for the final three seconds.

If no action is taken by the user within the allotted time period, the light automatically shuts OFF at the end of the thirty minute time setting. If the user touches the housing, however, the timer may be reset by the user according to the above described operative steps. Similarly, if the sixty minute timer is set, the sixty minute LED preferably flashes at a predetermined frequency or rate as the countdown commences. After thirty minutes, the sixty minute LED may advantageously deactivate and the thirty minute LED automatically activate in its place, flashing at a predetermined frequency/rate as the thirty minute countdown commences. Twenty-eight minutes after the thirty minute LED activates, the thirty minute LED may provide a discernible signal that the end of the countdown period is approaching, e.g., continuously flash at an increased frequency/rate, until seven seconds remain.

When seven seconds remain, the light dims down to 25 percent of its initial intensity and remains at that level for the final three seconds. If no action is taken by the user, the light shuts OFF at the end of the thirty minute time setting. If the user touches the housing, the timer may be reset according to the above described operative steps. In like measure, if the ninety minute timer is set, the ninety minute LED preferably flashes at a predetermined frequency or rate as the countdown commences. After thirty minutes, the ninety minute LED deactivates and the sixty minute LED activates in its place, flashing at a predetermined frequency/rate as the sixty minute countdown commences. Thereafter, thirty minutes after the sixty minute LED activates/begins flashing, the sixty minute LED deactivates and the thirty minute LED activates in its place, flashing at a predetermined frequency/rate. Twenty-eight minutes after the thirty minute LED activates, the thirty minute LED continuously flashes at an increased frequency/rate (i.e., provides a discernible signal) until seven seconds remain. When seven seconds remain, the light dims down to 25 percent of the initial intensity and remains at that level for the final three seconds. If no action is taken by the user the light shuts OFF at the end of the thirty minute time setting. If the user touches the housing, the timer may be reset according to the above described operative steps.

Once a timer setting is established and the user removes his/her touch from the housing, the light intensity may be adjusted by applying a LONG TOUCH to the housing and maintaining contact with the housing until the desired intensity level is reached. Assuming the most recent action taken with respect to light intensity involved increasing its intensity, the light will generally begin to dim from full intensity for the predetermined long period of time, i.e., three seconds. If the user removes his/her touch from the housing within that predetermined long period of time, the light intensity will remain at the intensity reached during the time the user touched the housing, and the timer setting will not be altered. Conversely, if the most recent action taken with respect to the light was to decrease its intensity, a LONG TOUCH will cause the intensity to be increased. Once the light reaches minimum intensity (i.e., OFF), the user's LONG TOUCH will cause the timer (if set) to be deactivated. Of note, timer settings may generally be canceled at any time if the user applies a SHORT TOUCH to the housing.

A further exemplary touch operated control system according to the present disclosure integrally incorporates the functionalities discussed hereinabove, either in whole or in part, into an electric device, e.g., a light, lamp, audio device or the like. According to the present disclosure, embodiments wherein the above-noted functionalities are integrally incorporated into an electric device advantageously operate in like manner to the control systems above, i.e., once the electric device is plugged into a power outlet.

In a preferred embodiment, the electric device constitutes a lamp that includes a base within which is mounted a printed circuit board as described above. The base is preferably formed of conductive material, such as metallic material or metalized plastic. The base generally includes holes defined therein for receiving/mounting visual indicating means, such as LEDs. A power cord extends from the base for a predetermined distance to a plug. The base supports or defines a conventional stem or extension that may also be fabricated from a conductive material and that supports/defines a light fixture. The base/stem may also support a shade, as is well known in the lighting art. Contact with the conductive portions of the lamp allow the user to gain the functionalities described above.

Additional objects and advantages of the touch operated control systems of the present disclosure will become apparent to those skilled in the art upon reference to the detailed description taken in conjunction with the provided figures.

BRIEF DESCRIPTION OF THE DRAWINGS

To facilitate a full and complete understanding of the disclosure herein, reference is made to the attached figures and the accompanying detailed description, in which.

DETAILED DESCRIPTION OF PREFERRED EMBODIMENT(S)

Figure 1:
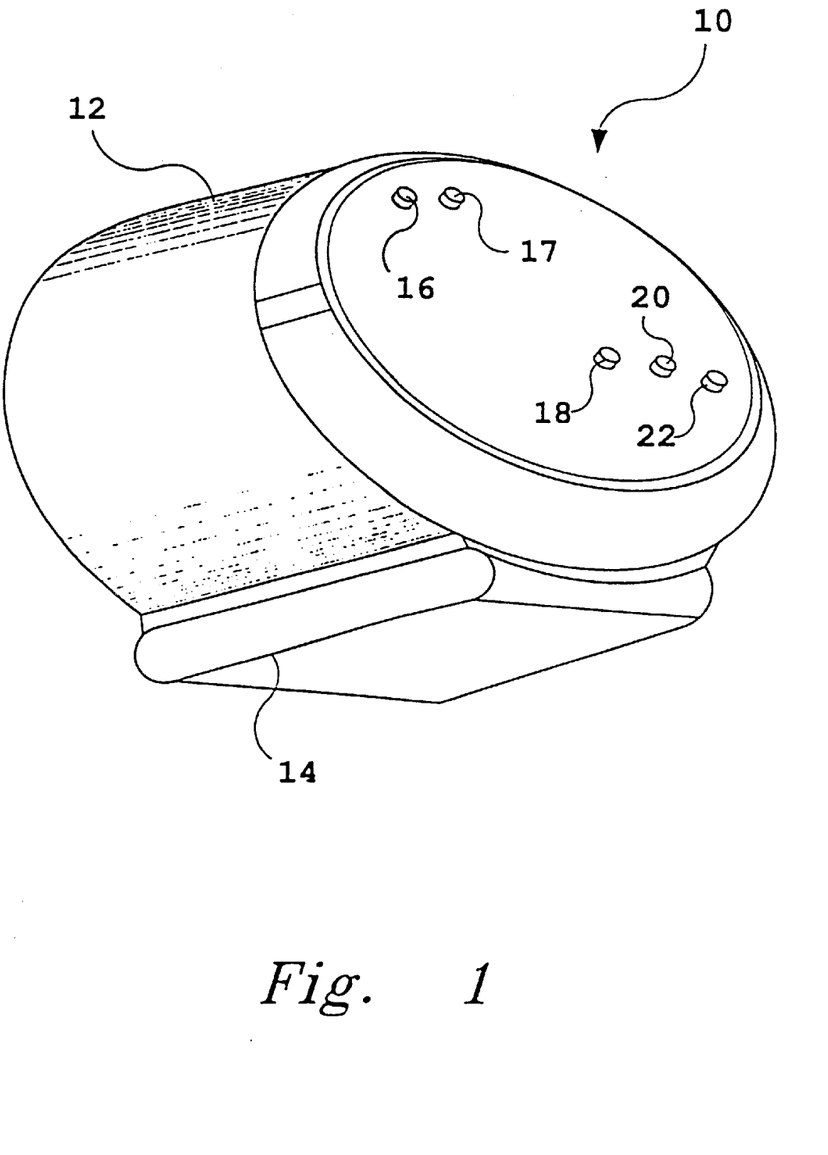
FIG. 1 is a front perspective view of a first example of a touch operated control system according to the present disclosure.
Figure 2A:
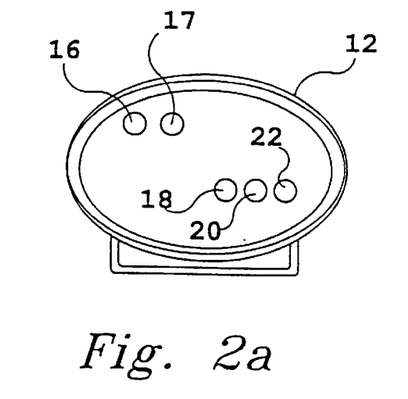
FIG. 2A is a front view of the touch operated control system of FIG. 1.
Figure 2B:
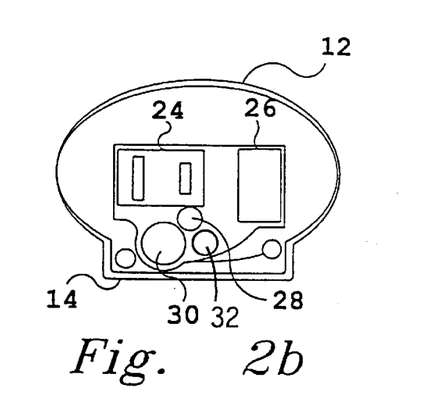
FIG. 2B is a rear view of the touch operated control system of FIG. 1.
Figure 2C:
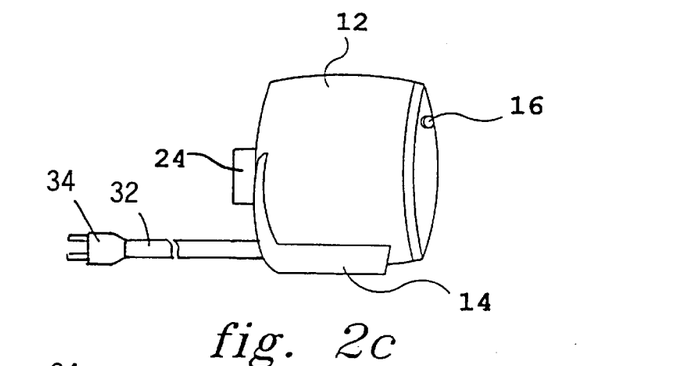
FIG. 2C is a side view of the touch operated control system of FIG. 1.
Figure 2D:
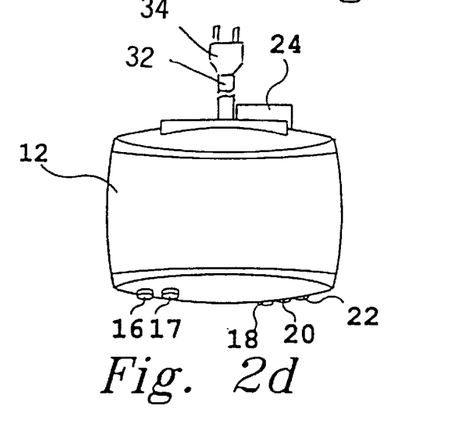
FIG. 2D is a top view of the touch operated control system of FIG. 1.
Figure 2E:
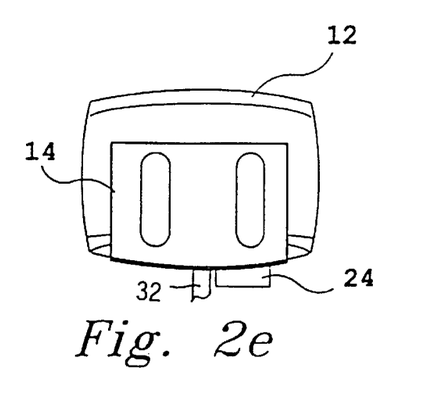
FIG. 2E is a bottom view of the touch operated control system of FIG. 1.
Figure 3:
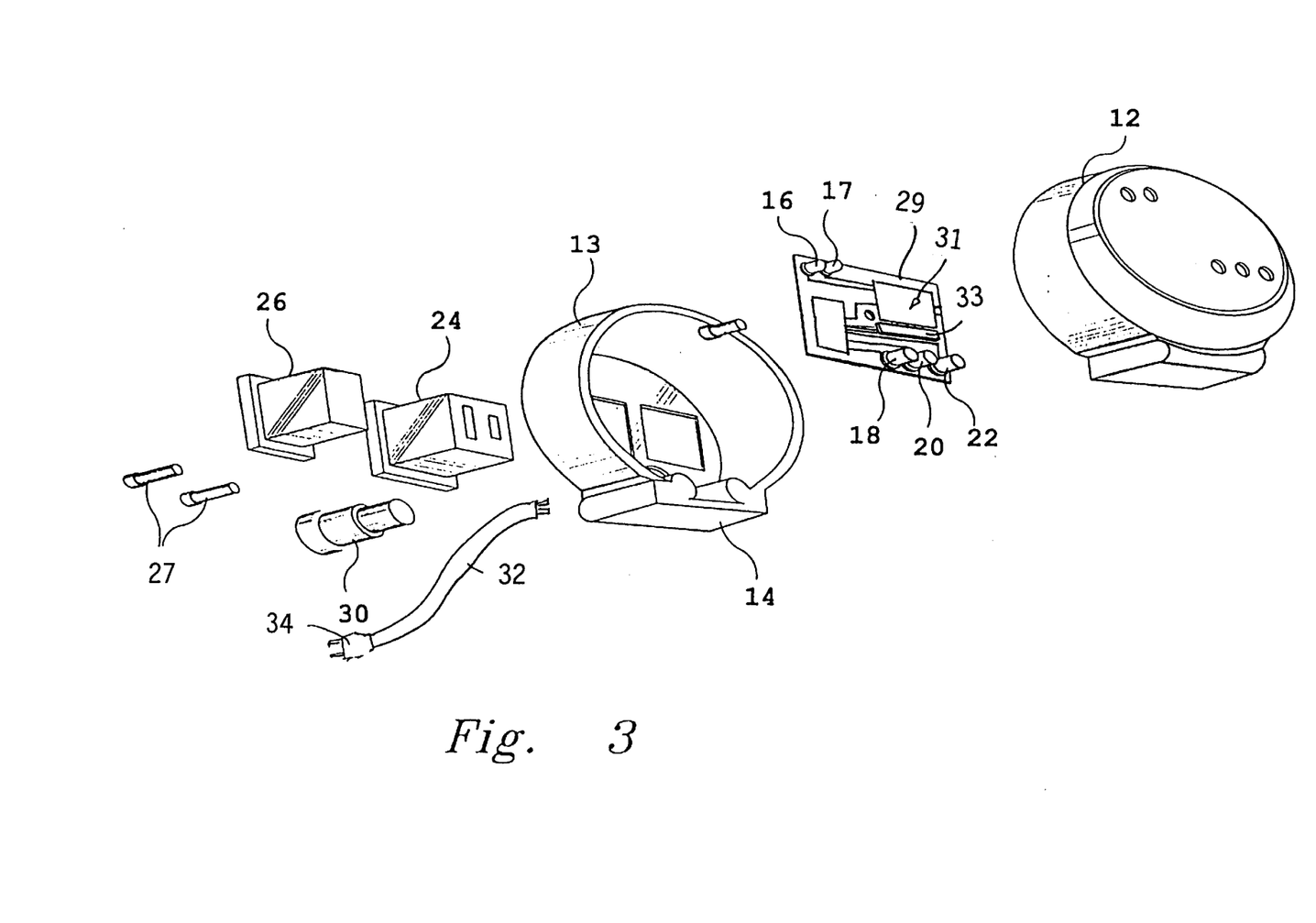
FIG. 3 is an exploded view of the touch operated control system of FIG. 1.

Turning now to FIGS. 1 through 3, a first embodiment of a touch operated control system 10 according to the present disclosure is depicted. The exemplary control system 10 is a touch operated dimming device with a programmable timer that sets an associated electric device, e.g., a light/lamp, to OFF after a predetermined period of time. According to the first embodiment, the control system 10 includes a housing 12 having a front portion, a rear portion, and a base 14. The front portion of the housing 12 includes holes defined therein for receiving visual indicating means, such as LEDs. The rear portion of the housing 12 includes plural holes defined therein for receiving elements such as a power receptacle 24, a power switch 26, a fuse 30, and plural fastening means 27, such as screws. A power receptacle 24 is provided for receiving the plug from an electrical device, such as a light or a lamp. A power switch 26, while not required, may be used for positively providing/controlling power supply to the power receptacle 24.

Fastening means 28 are utilized to fasten the front portion of the housing 12 to the rear portion of the housing. A printed circuit board 29 is mounted inside the housing. The printed circuit board 29 has circuitry 31, preferably including a microprocessor 33. Printed circuit board 29 includes switching circuitry that is operationally connected to the touch operated aspect of control system 10, e.g., housing 12, and timing circuitry that is operationally connected to the switching circuitry. The circuitry 31 also includes dimming circuitry, which is well known by those skilled in the art. The circuitry 31 is preferably touch activated so as to automatically connect power with the power receptacle 24, e.g., when the housing 12 is touched.

The housing 12 is preferably formed of conductive material, such as metallic material or metalized plastic. It is further contemplated that ancillary touch activated surfaces may be provided in conjunction with housing 12, either to extend the available touch activated surfaces or replace housing 12 as a touch activated surface. The switching circuitry 31 will conduct the requisite amount of electrical voltage to the power receptacle 24 when the housing 12 is touched. Generally mounted on the printed circuit board are visual indicating means 16, 17, 18, 20, 22, such as LEDs. Visual indicating means 16 is preferably an ON/OFF LED to indicate when the control system 10 is ON or OFF. Visual indicating means 17 is preferably a STANDBY LED to indicate when the touch operated control system 10 is in STANDBY mode. The STANDBY mode is configured to sense when an electrical device, e.g., a light or lamp, connected to the control system has been turned OFF using a switch located on the lamp, or if a light bulb has burned out on a light or lamp powered by the control system. This is achieved by always sending a slight amount of voltage (or power) to the electrical device (e.g., lamp), even when the control system is set to full dim down. Such a voltage (or power) is not enough to make the electrical device function, e.g., the light glow, but is enough to allow the control system to sense a load, or completed circuit. Thus, for example, when a lamp is switched OFF at the lamp, the load is missing, the circuit is broken, and the control system automatically goes into STANDBY mode.

Visual indicating means 18 is preferably an LED that indicates that the control system 10 is in TIMER mode and set for a first predetermined time period, e.g., thirty minutes. Visual indicating means 20 is preferably an LED that indicates that the control system 10 is in TIMER mode and set to a second predetermined timer period, e.g., sixty minutes. Visual indicating means 22 is preferably a further LED that indicates that the control system 10 is in TIMER mode and set to a third predetermined period, e.g., ninety minutes.

Certain aspects of the operation of the exemplary touch operated control system 10 will now be described. Initially, a standard AC power connector 34 associated with the control system 10 via a power line 32 is plugged into a standard household outlet, rated at 120 V, 60 Hz, alternating current, or 210 V, 50 Hz international, alternating current. In preferred embodiments of the present disclosure, the circuitry 31 associated with control system 10 automatically senses 50 Hz or 60 Hz power, and will work appropriately for either standard. The household outlet may always be receiving power from an external source. Alternatively, the household outlet may intermittently/controllably receive power from an external source, with control of such intermittent power delivery being provided by way of a remote switch, such as a wall mounted switch or the like.

An electrical device, such as a light, lamp, audio device or the like, is plugged into the power receptacle 24 of the control system 10. Typically, the electrical device, e.g., a light or lamp, includes an integrated light switch. If the control system 10, as shown in FIGS. 1 through 3, is receiving power from a household outlet, and the control system 10 includes a power switch 26 and the power switch 26 is turned ON, power is provided to the light that is plugged into the control system 10, the ON/OFF LED 16 on the apparatus 10 turns ON to indicate that the control system 10 is ON, and the STANDBY LED 17 on control system 10 turns ON to indicate that the control system 10 is in STANDBY mode. If the power switch on the light is subsequently turned ON, the light attached to the control system 10 dims up to full brightness within a predetermined short period of time, preferably 1.5 seconds, the ON/OFF LED 16 on the control system 10 remains ON to indicate that control system 10 is ON, and the STANDBY LED 17 on control system 10 turns OFF to indicate that control system 10 is not in STANDBY mode.

If the power switch on the light is ON and is then subsequently turned OFF and the power switch 26 on control system 10 remains ON, the light attached to control system 10 turns OFF immediately, the ON/OFF LED 16 on control system 10 remains ON to indicate that control system 10 is ON, and the STANDBY LED 17 on control system 10 turns ON to indicate that control system 10 is in STANDBY mode. If the power switch on the light is ON and a light bulb on the light burns out, and the power switch 26 on control system 10 remains ON, the light attached to control system 10 turns OFF immediately, the ON/OFF LED 16 on control system 10 remains ON to indicate that control system 10 is ON, and the STANDBY LED 17 on control system 10 turns ON to indicate that control system 10 is in STANDBY mode. This advantageous functionality is enabled by the constant low voltage/power fed from control system 10 to the light/lamp.

If the power switch on the light is ON and the power switch 26 on control system 10 is subsequently turned OFF, the light attached to control system 10 immediately turns OFF, the ON/OFF LED 16 on control system 10 turns OFF to indicate that control system 10 is OFF, and the STANDBY LED 17 on control system 10 turns OFF to indicate that control system 10 is not in STANDBY mode. If the power receptacle intermittently receives power from an external source, e.g., based on actions taken with respect to a remote switch such as a wall mounted switch or the like, the above described functional/operational variations/behaviors remain consistent if the remote switch is in the ON position. If the remote switch is turned to the OFF position, no power is received from the power receptacle, no power is received by control system 10, no power is received by the light attached to control system 10, and therefore the LEDs associated with control system 10 and the light attached to control system 10 immediately turn OFF.

If the remote switch is subsequently turned to the ON position, control system 10 and the light attached to control system 10 will again receive power, and the LEDs associated with control system 10 and the light attached to control system 10 will illuminate accordingly. For example, if the remote switch is turned to the ON position when the power switch on the light is in the ON position and the power switch 26 on control system 10 is in the ON position, the light attached to control system 10 will automatically dim up to full brightness within the same predetermined short period of time, e.g., 1.5 seconds, the ON/OFF LED 16 on control system 10 turns ON to indicate that control system 10 is ON, and the STANDBY LED 17 on control system 10 remains OFF to indicate that control system 10 is not in STANDBY mode.

If a user touches a touch-activated surface associated with control system 10, e.g., housing 12 as shown in FIGS. 1–3, for a short period of time (hereinafter called SHORT TOUCH), preferably less than ½ second, the light dims up to full brightness within a predetermined short period of time, preferably 1.5 seconds. If the user has programmed a timer setting into control system 10, it is immediately canceled after a SHORT TOUCH is applied to the touch-activated surface, e.g., housing 12. If the user subsequently applies a SHORT TOUCH to housing 12, the light dims down from full brightness and shuts OFF within a predetermined short period of time, preferably 1.5 seconds. When a SHORT TOUCH is applied to the touch-activated surface, e.g., housing 12, the light will either dim full up or full down, based on the last function performed, i.e., up, then down, then up, and so on. When a SHORT TOUCH is applied to a touch-activated housing 12, the light generally dims up or down at a predetermined rate, e.g., over the course of a predetermined short period of time, e.g., 1.5 seconds, and any timer settings will be canceled.

If the user touches and holds the housing 12 for an extended period of time (hereinafter referred to as LONG TOUCH), preferably greater than ½ second, the light dims up to full brightness within a predetermined period of time. In preferred embodiments of the present disclosure, such predetermined period of time associated with a LONG TOUCH is longer than the predetermined period of time after applying a SHORT TOUCH to the housing 12. The longer period of time is preferably in the range of three seconds. If the user discontinues touching the housing 12 before the predetermined period (e.g., three seconds) necessary to achieve full brightness of the light, the light intensity will remain at the intensity reached during the time the user touched the housing 12, and no timer setting will be effectuated.

In a preferred embodiment of the present disclosure, the user is able to set a timer associated with control system 10 by maintaining contact with the touch-activated aspect of control system 10 for a longer period of time. Thus, in a preferred control system according to the present disclosure, if the user touches and holds the housing 12 one and a half seconds longer than the three seconds necessary to achieve full brightness of the light, the timer associated with control system 10 is automatically set for a first predetermined period, e.g., thirty minutes, and the associated LED, e.g., thirty minute LED 18, activates. If the user continues to hold/contact the housing 12 for an additional period of time, e.g., an additional 1.5 seconds, the timer is set for a second predetermined period, e.g., sixty minutes. In such case, the thirty minute LED 18 deactivates, and a sixty minute LED 20 activates. If the user continues to hold/contact the housing 12 for an additional predetermined period, e.g., an additional 1.5 seconds, the timer is set for a further predetermined period, e.g., ninety minutes, the sixty minute LED 20 deactivates, and the ninety minute LED 22 activates. If the user continues to hold/contact the housing 12 more than an additional 1.5 seconds, the timer will begin to cycle through the zero, thirty, sixty, and ninety minute time settings, and the timer will be set according to contact increments of 1.5 seconds.

Once the timer of the touch operated control system 10 is set to the desired timeframe, e.g., thirty minutes, sixty minutes, or ninety minutes, the timer begins the countdown cycle. In preferred embodiments of the present disclosure, control system 10 signals the user when the timer approaches the end of its countdown cycle. Thus, for example, if the thirty minute timer is set, the thirty minute LED 18 begins to continuously flash at a predetermined frequency/rate as the countdown commences and, after twenty eight minutes have elapsed, the thirty minute LED 18 begins to flash at an increased frequency/rate to signal the user that the timer is reaching the end of its countdown cycle. When the timer reaches a further predetermined point in the countdown, e.g., a point when seven seconds remain, the light advantageously dims down to further signal the user of the impending culmination of the countdown cycle, e.g., the light dims to 25% of its initial intensity and remains at that level for the final three seconds. If no action is taken by the user, the light shuts OFF at the end of the thirty minute timer setting. Conversely, if the user touches the housing before the end of the thirty minute countdown cycle, the timer can be reset according to the above-described operative discussion.

According to preferred embodiments of the present disclosure, individual timer settings automatically interact and/or operate cooperatively to keep the user apprised of countdown status. Thus, for example, if the sixty minute timer is set, after the initial thirty minute countdown period has elapsed, the sixty minute LED 20 deactivates and the thirty minute LED 18 automatically activates. As noted above, twenty-eight minutes after the thirty minute LED 18 activates, the thirty minute LED 18 continuously flashes at an increased frequency/rate to signal the user that the countdown cycle is nearing completion, e.g., until seven seconds remain. When seven seconds remain, the light dims down to 25 percent of its initial intensity and remains at that level for the final three seconds. If no action is taken by the user, the light shuts OFF at the end of the thirty minute time setting. If the user touches the housing, the timer can be reset according to the above-described operative steps.

Similarly, if the ninety minute timer is set, the ninety minute LED 22 immediately begins flashing to signal the user that the ninety minute countdown cycle is ongoing. After thirty minutes, the ninety minute LED 22 deactivates and the sixty minute LED 20 automatically activates. When activated, the sixty minute LED advantageously flashes at a predetermined frequency/rate to signal the user that the sixty minute countdown cycle is ongoing. Thirty minutes after the sixty minute LED 20 activates, the sixty minute LED 20 deactivates and the thirty minute LED 18 automatically activates. When activated, the thirty minute LED flashes at a predetermined frequency/rate to signal the user that the thirty minute countdown cycle is ongoing. Twenty-eight minutes after the thirty minute LED 18 activates, the thirty minute LED 18 continuously flashes at an increased frequency/rate until seven seconds remains. When seven seconds remain, the light dims down to 25 percent of its initial intensity and remains at that level for the final three seconds. If no action is taken by the user, the light shuts OFF at the end of the thirty minute time setting. If the user touches the housing, the timer can be reset according to the above-described operative steps.

Once a timer setting is established and the user removes his/her touch from the touch activated aspect of control system 10, e.g., housing 12, the light intensity may nonetheless be adjusted by the user according to preferred embodiments of the present disclosure. Such intensity adjustments may be accomplished by the user by applying a LONG TOUCH to the touch activated aspect of control system 10, e.g., housing 12, and maintaining such contact for an appropriate period. Thus, assuming the most recent action with respect to light intensity was an increase in light intensity, the light will begin to dim from its initial intensity over a predetermined period of time, e.g., three seconds, to reach zero intensity. If the user removes his/her touch from the touch activated aspect of control system 10, e.g., housing 12, within that predetermined period of time, the light intensity will remain at the intensity reached during the time the user touched the housing 12, and the timer setting will not be altered. Further adjustments to light intensity may be advantageously undertaken by resuming contact with the touch activated aspect of control system 10. Independent of the light intensity adjustments described hereinabove, the timer setting can be canceled at any time if the user applies a short touch to the touch activated aspect of control system 10, e.g., housing 12.

Figure 4:
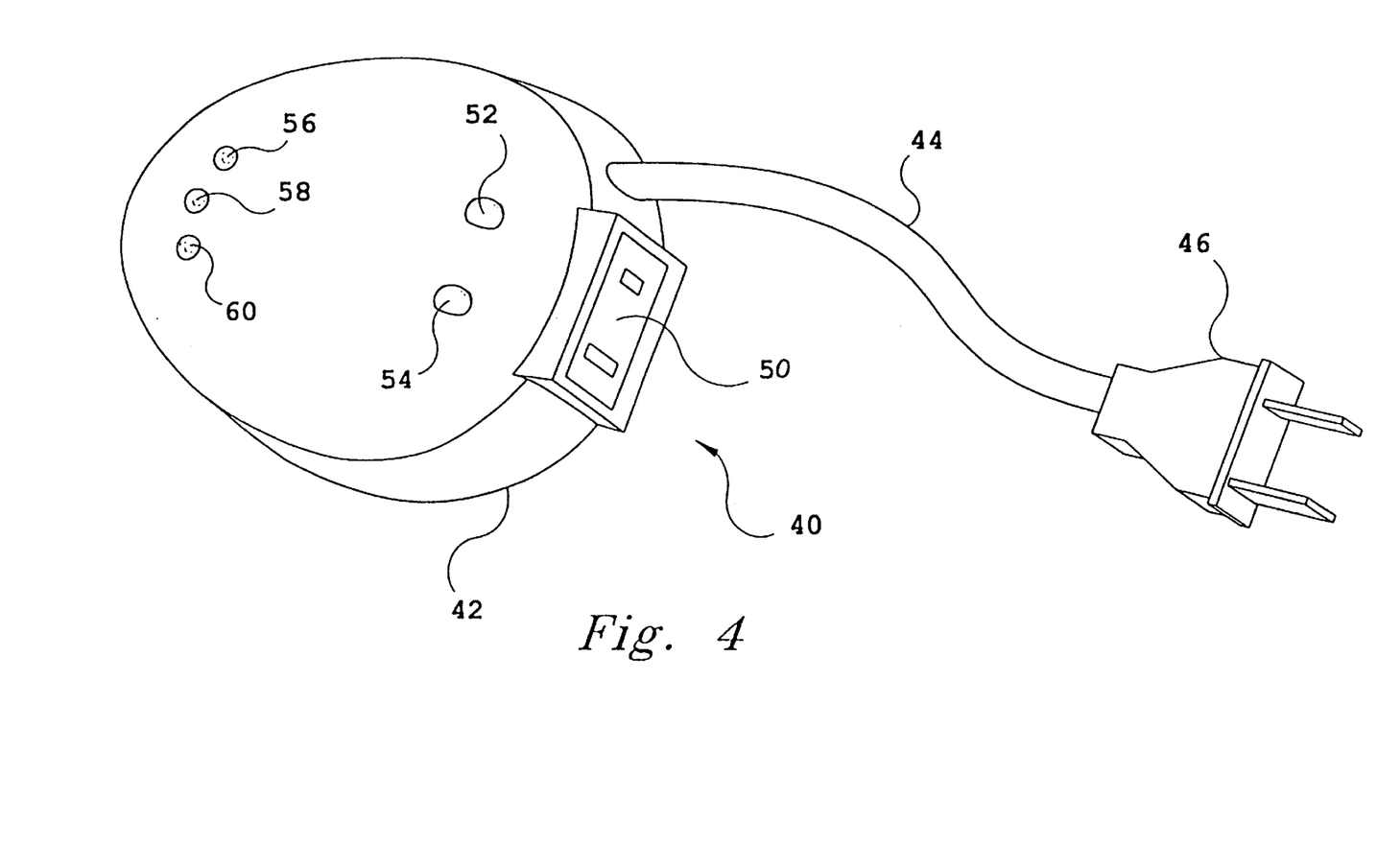
FIG. 4 is a front perspective view of a second touch operated control system according to the present disclosure.
Figure 5A:
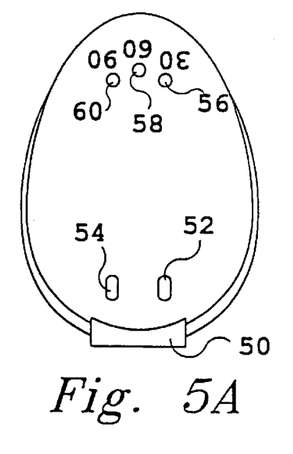
FIG. 5A is a top view of the second touch operated control system of FIG. 4.
Figure 5B:
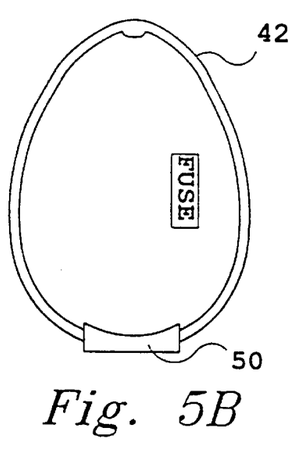
FIG. 5B is a bottom view of the second touch operated control system of FIG. 4.
Figure 5C:
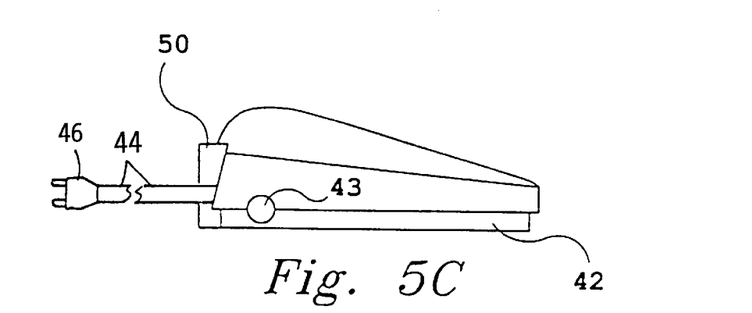
FIG. 5C is a side view of the second touch operated control system of FIG. 4.
Figure 5D:
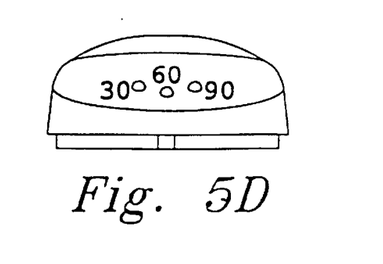
FIG. 5D is a front view of the second touch operated control system of FIG. 4.
Figure 5E:
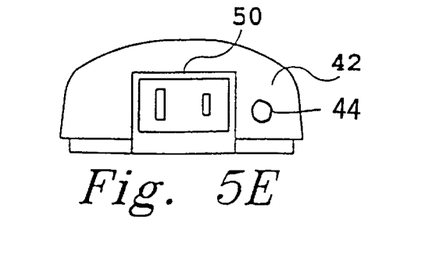
FIG. 5E is a rear view of the second touch operated control system of FIG. 4.

Referring now to FIGS. 4 through 5E, a second exemplary embodiment of a touch operated control system 40 according to the present disclosure is shown. The control system 40 includes a housing 42, a receptacle 50, ON/OFF LED 52, STANDBY LED 54, and timer indicating LEDs 56, 58, 60. When power is provided to control system 40, e.g., from a power outlet, the ON/OFF LED 52 on control system 40 turns ON to indicate that control system 40 is ON and the STANDBY LED 54 on control system 40 turns ON to indicate that control system 40 is in STANDBY mode. Thereafter, if control system 40 is receiving power from a power outlet, and a light is plugged therein, and further if the power switch on the light is turned ON, the light automatically dims up to full brightness within a predetermined short period of time, e.g., 1.5 seconds, the ON/OFF LED 52 on the control system 40 remains ON to indicate that control system 40 is ON, and the STANDBY LED 54 on control system 40 turns OFF to indicate that control system 40 is not in STANDBY mode.

If the power switch on the light is ON and is then subsequently turned OFF, the light attached to control system 40 turns OFF immediately, the ON/OFF LED 52 on control system 40 remains ON to indicate that control system 40 is ON, and the STANDBY LED 54 on control system 40 turns ON to indicate that control system 40 is in STANDBY mode. If the power switch on the light is ON and a light bulb attached to the light burns out, the light attached to control system 40 immediately turns OFF, the ON/OFF LED 52 on control system 40 remains ON to indicate that control system 40 is ON, and the STANDBY LED 54 on control system 40 turns ON to indicate that control system 40 is in STANDBY mode. If the power receptacle 50 on control system 40 intermittently receives power from an external source via means of a remote switch, such as a wall mounted switch or the like, the above described functional variations/behaviors remain consistent if the remote switch is in the ON position.

If the remote switch is turned to the OFF position, no power is received out of the power receptacle, no power is received by control system 40 and the associated LEDs, and the light attached to control system 40 immediately turns OFF. If the remote switch is subsequently turned to the ON position, control system 40 and the light attached to control system 40 will again receive power, and the associated LEDs and the light attached to control system 40 will illuminate accordingly. For example, if the remote switch is turned to the ON position when the power switch on the light is in the ON position, the light attached control system 40 will dim up to full brightness within a predetermined short period of time, e.g., 1.5 seconds, the ON/OFF LED 52 on control system 40 turns ON to indicate that control system 40 is ON, and the STANDBY LED 54 on control system 40 remains OFF to indicate that control system 40 is not in STANDBY mode. As will be apparent to persons skilled in the art, touch operated control system 40 is adapted to provide the same or comparable functionalities as control system 10 described hereinabove, e.g., with respect to ON, OFF, STANDBY, SHORT TOUCH, LONG TOUCH, and timer operations.

Figure 6:
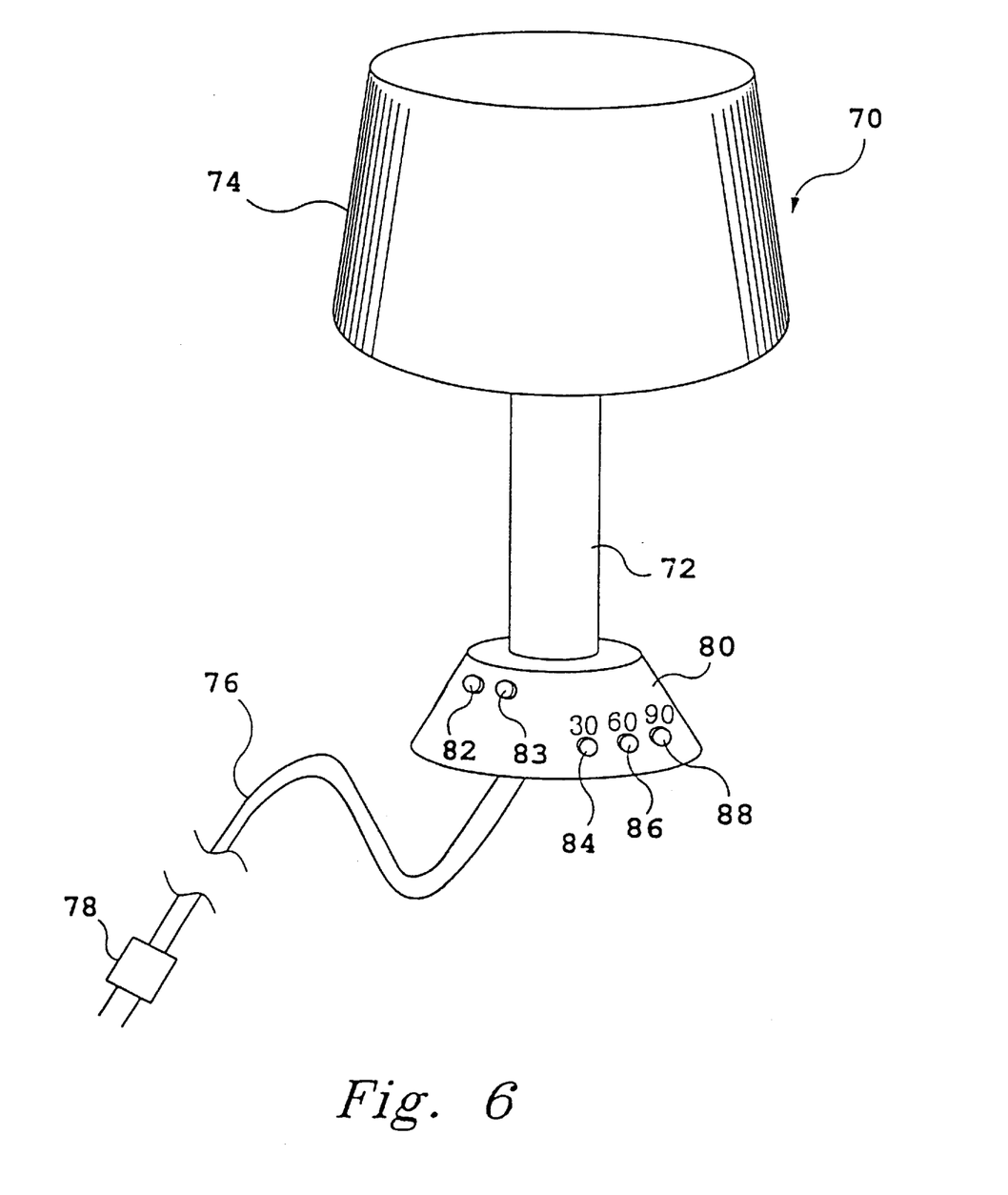
FIG. 6 is a front perspective view of a third touch operated control system according to the present disclosure.

Turning now to FIG. 6, a third exemplary embodiment of a touch operated control system according to the present disclosure is shown, in which the light dimmer/timer/touch-activated sequencing functionalities are incorporated into a lamp 70, i.e., the light dimmer/timer/touch-activated sequencing elements are integral with lamp 70. The lamp 70 generally operates in the same manner and offers the same functional capabilities as control systems 10, 40 described above, i.e., once lamp 70 is plugged into a power outlet. The lamp 70 preferably includes a metal, metalized, or otherwise conductive base 80 within which is mounted a printed circuit board as described above. The base 80 includes holes defined therein for receiving visual indicating means 82, 83, 84, 86, 88, such as LEDs. A power cord 76 extends from the base 80 for a predetermined distance to a plug 78. The base 80 supports a conventional light stem 72 which supports a light bulb socket, and may also support a shade 74, as is well known in the lighting art. As will be readily apparent to persons skilled in the art, by integrating touch activation into the design of lamp 70, the advantageous functionalities and capabilities associated with control systems 10, 40 may be readily incorporated directly into lamp 70, and the operation thereof will correspond to the operation of control systems 10, 40, as described above.

An advantageous aspect of the control systems described hereinabove, i.e., control systems 10, 40 and lamp 70, is the manner in which touch activation sequencing and duration, as sensed by touch activation aspects of the respective systems and communicated to associated circuitry, control system operation. Thus, the disclosed control systems obviate the need for switching hardware to control intensity, on/off status, and timer operation. Rather, system circuitry integral to the disclosed control systems provides optimal control of all operative aspects of associated electrical devices through a single point of user contact, e.g., a housing associated with the control system. Indeed, a user is able to control an electrical device's intensity, on/off status and timer operation through a simple sequence of touch activation contacts, varying the duration of such contacts to achieve desired results. Through advantageous utilization of LONG TOUCH and SHORT TOUCH interactions with the disclosed control systems, the disclosed circuitry provides appropriate electrical input to the associated electrical device to achieve the desired functionality.

Figure 7:
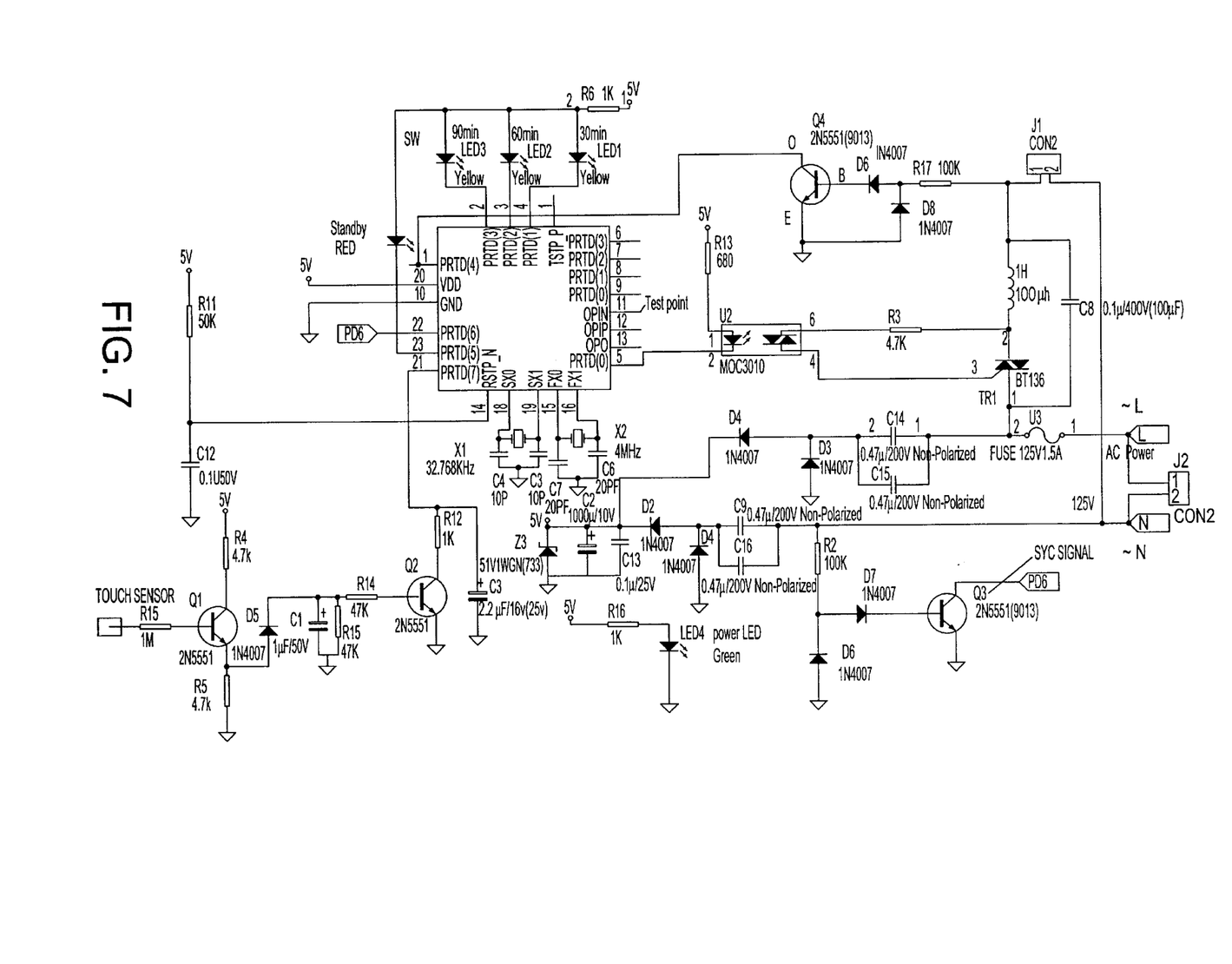
FIG. 7 is an exemplary circuit diagram according to the present disclosure.

With reference to FIG. 7, an exemplary circuit for use in control systems according to the present disclosure is depicted. The lower left section of FIG. 7 depicts exemplary touch sensor circuitry for use herein. The touch sensor circuitry consists of Q1 which amplifies 60 or 50 hertz signals that are created by an external source. In the case of the disclosed control systems, the signals are provided by a person's/user's body based on such person's/user's touch activation, and gathered through the conductive aspect of the control system, e.g., the housing. R15 (1 M ohm) resistor is used as a protection device against high voltage spikes. R4 and R5 are used to bias the buffer transistor. D5, C1, R8 and R14 make up a low frequency filter that eliminates an alternating signal when detecting a touch input. Q2 acts as a buffer and inverter. R12 and C5 forms another filter to eliminate high spikes from outer signals that are passed from the initial low frequency filter. Thus, a person's/user's touch needs to exist for a predetermined amount of time before this touch activation circuit will enable the input PRTD(7) of the integrated circuit (IC).

The power supply section of the depicted exemplary circuit is located in the lower center and right sections of FIG. 7. Power comes into the unit, is first sent through a 1.5A protection fuse, and is located on the HOT line (not the Neutral line). The power is split off into two sections, one for power to the lamp controller sections and the other to the low voltage power needed to operate the components. The low voltage section consists of C4 and C9 which act as an inductive resistor to drop the voltage. D1,2,3,4 perform a full rectification of the alternating current (AC) into a floating ground direct current (DC) voltage. C2, C13 and Z2 function to provide voltage regulation and filtering of remaining AC, thus creating a clean DC 5 VDC. C13 also allows for a time delay to hold the current program in case of a short power interruption (approx 1 second). This keeps the unit from running the "power on" software routine during a short power glitch, e.g., caused by factors such as lighting or occasional brownouts.

Exemplary control circuitry for an electrical device, e.g., a lamp, is depicted in the upper right section of FIG. 7. The power to the lamp is controlled through triac TR1. This component controls power to the lamp by turning on and off during the specific phases of the power. C8 and H1 are used to lower EMI radiation from the triac switching on and off; such radiation could cause static on nearby radios or televisions. The triac is controlled by the IC program via an Optical Isolator component, U2. This circuit is depicted in the center of FIG. 7. The Opto-isolator is required to keep the AC common voltage separate from the system's DC floating ground. This is necessary in order to allow the unit to operate effectively in conditions where the AC supply neutral and hot wiring configuration are wired backwards.

In order to trigger the triac at the exact/desired time, sampling of the incoming AC is done through components R2, D0, D7, and Q3. A pulse is created by this circuit and sent into the IC via PD6. This exemplary circuit is depicted in the lower right section of FIG. 7. The IC program samples this pulse and determines when to send a pulse out to the Opto-isolator, U2.

The IC program also controls a set of light emitting diodes (LED1,2,3). These are indicated in the upper left portion of FIG. 7. These LED's indicate timer modes, e.g., 30, 60, or 90 minutes, which are countdown values until the unit dims to off. If the unit is only in the dim mode, then these LED's do not operate. When the user wishes to enable the timer countdown program, then the LED's will operate, but only one of three will illuminate at a given time. Also, LED 5 is labeled "Standby" and is used to indicate if the system is in a standby mode. This mode is entered if the IC detects that PRT(D) has an "Out of Phase" condition. The exemplary circuit in the upper right of FIG. 7 detects this information. LED 4 is powered thru R16, which act as a voltage drop resistor, to indicate power is on.

The Standby circuit consists of a resistor current reducer R17 and D8, D6 which rectify the signal. The signal is then buffered into Q4 which inverts the signal and feeds the IC. When the circuit is in normal operation, the phase of the Sync Signal Q3 will be in phase with Q4. If the external circuit is opened, either due to the light switch being open or the lamp burn being open, then an "Out of Phase" condition will occur. When this happens, the triac will cease firing and the "Standby" LED will glow. Once the unit senses an in phase condition, the power up software routine will start. This monitoring of this standby circuit is continuous as long as power is supplied to the unit.

The IC (U1), which is the exemplary processor circuit that does all the software routines in the disclosed system, operates at two frequencies. These two frequencies are 32.768 KHZ (made up of X1,C4,C3) and 4 MHZ (made up of X2,C7,C6). In order to ensure that the processor U1 does not enter a locked mode during power shutdown, a reset circuit is used. An exemplary reset circuit is depicted on the left side of FIG. 7. The reset circuit consists of C10, D9, R9, R7 and Q5. If the power drops below 2.5 VCD (which happens during power removal and C2 bleeding off), then this circuit will trigger upon power up. The trigger signal biases Q5 which feeds a delay circuit made up of C112 and R11. When this delay has expired, then RSTP_N will open and the processor will reset and begin the power up sequence.

Thus, the exemplary circuit depicted in FIG. 7 supports the functionalities and operative interactions disclosed with respect to control systems 10, 40 and lamp 70. Alternative circuits may be designed to achieve the desired functionalities and operative interactions disclosed herein, as will be apparent to persons skilled in the art based on the teachings contained herein.

Additionally, the present disclosure describes and illustrates several preferred touch operated control systems. While particular embodiments of the present disclosure have been described, it is not intended that the disclosure be limited thereto, as it is intended that the present disclosure be broadly interpreted and that alternative embodiments that encompass the spirit and scope of the disclosed systems be included therein. For example, while exemplary SHORT TOUCH and LONG TOUCH times have been disclosed, it will be understood that other times can be used and are explicitly contemplated. In addition, it will be appreciated that the time for dimming up or dimming down can be varied from the exemplary times disclosed herein, and that dim up and dim down timer settings can be different from each other. Furthermore, timer settings other than 30, 60, and 90 minutes can be used, and digital readout of the countdown cycle may be advantageously provided.

Moreover, while in the third embodiment, the base is stated to be made of a conductive material, it will be appreciated that the stem may additionally or alternatively be made of a conductive material and that the circuitry can be operationally connected to the stem, such that touching the stem operates the circuitry. It is further contemplated that control systems according to the present disclosure may take a multitude of forms and be positioned/mounted in a variety of remote locations relative to the electrical device(s) being controlled thereby. Thus, for example, the disclosed control systems may be advantageously deployed within a wall-mounted electrical box, control panel or the like. It will therefore be appreciated by those skilled in the art that yet other modifications could be made to the present disclosure without deviating from its spirit and scope, as claimed.

What is claimed is:

1. A control system for use with an electrical device adapted to operate at variable intensity, comprising:
   a. a housing that defines an enclosure;
   b. circuitry mounted within said enclosure and including switching functionality adapted to control power supply to said electrical device, said circuitry being in communication with a source of voltage;

c. a touch activated surface associated with said housing and in communication with said circuitry;

wherein a first mode of contact with respect to said touch activated surface causes said circuitry to control whether said electrical device is on;

wherein a second mode of contact with respect to said touch activated surface causes said circuitry to control said variable intensity of said electrical device; and wherein said circuitry is responsive to said electrical device being inoperative at said electrical device, said circuitry adopting a first condition in response to said electrical device being inoperative at said electrical device, and said circuitry adopting a second condition in response to said electrical device being fully operative at said electrical device.

2. A control system according to claim 1, wherein said electrical device is a lamp and said inoperative condition is selected from the group consisting of an inoperative light bulb at said lamp and a switch associated with said lamp being in an off position.

3. A control system according to claim 1, wherein said circuitry includes electrical componentry adapted to automatically operate with voltage sources at 50 Hz and 60 Hz.

4. A control system according to claim 1, wherein said first condition adopted by said circuitry includes providing an illuminated visually discernible signal reflecting said inoperative electrical device.

5. A control system according to claim 4, wherein said second condition adopted by said circuitry includes providing a second visually discernible signal reflecting said operative electrical device.

6. A control system for use with an electrical device adapted to operate at variable intensity, comprising:

a. a housing that defines an enclosure;

b. circuitry mounted within said enclosure and including switching functionality adapted to control power supply to said electrical device;

c. a touch activated surface associated with said housing and in communication with said circuitry;

wherein a first mode of contact with respect to said touch activated surface causes said circuitry to control whether said electrical device is on; and wherein a second mode of contact with respect to said touch activated surface causes said circuitry to control said variable intensity of said electrical device; and wherein said first mode of contact is different than said second mode of contact.

7. A control system according to claim 6, wherein said electrical device is a lamp.

8. A control system according to claim 6, wherein said control system is integral with said electrical device.

9. A control system according to claim 6, wherein said control system is remotely located relative to said electrical device.

10. A control system according to claim 6, wherein said touch activated surface is defined by at least a portion of said housing.

11. A control system according to claim 6, wherein said touch activated surface is fabricated from a conductive material selected from the group consisting of metal, metalized plastic and combinations thereof.

12. A control system according to claim 6, wherein said housing is adapted to communicate with a source of voltage, and wherein said circuitry includes electrical componentry adapted to automatically operate with voltage sources at 50 Hz and 60 Hz.

13. A control system according to claim 6, wherein said first mode of contact causes said circuitry to turn on said electrical device over a predetermined period of time.

14. A control system according to claim 13, wherein, subsequent to turning on said electrical device, said first mode of contact causes said circuitry to turn off said electrical device over a predetermined period of time.

15. A control system according to claim 6, wherein said circuitry supplies a predetermined minimum level of power to said electrical device whenever said circuitry is receiving power from a voltage source, said predetermined minimum level of power being insufficient to operate said electrical device.

16. A control system according to claim 15, wherein said circuitry includes phase sensing functionality that is adapted to sense an open circuit between said electrical device and said circuitry.

17. A control system according to claim 16, wherein a visually discernible signal is provided by said circuitry upon sensing of an open circuit by said phase sensing functionality.

18. A control system according to claim 6, wherein said first mode of contact is a short duration contact with said touch activated surface and said second mode of contact is a contact with said touch activated surface of greater duration than said short duration contact.

19. A control system according to claim 18, wherein said short duration contact is less than or equal to 0.5 seconds, and said greater duration contact is equal to or greater than 1.0 seconds.

20. A control system according to claim 18, wherein said short duration contact sequentially causes said electrical device to be turned on and to be turned off.

21. A control system according to claim 18, wherein said greater duration contact causes said variable intensity of said electrical device to gradually increase, and wherein discontinuation of said greater duration contact sets said variable intensity of said electrical device.

22. A control system according to claim 21, wherein resumption of said greater duration contact after said discontinuation causes said variable intensity of said electrical device to gradually decrease, and wherein a second discontinuation of said greater duration contact resets said variable intensity of said electrical device.

23. A control system according to claim 6, wherein said circuitry further includes timer functionality.

24. A control system according to claim 23, wherein said timer functionality includes a plurality of predetermined timer settings.

25. A control system according to claim 23, wherein said housing includes a plurality of visibly discernible indicators that provide visibly discernible indications based on said timer functionality.

26. A control system according to claim 25, wherein said visually discernible indicators comprise a plurality of LEDs.

27. A control system according to claim 23, wherein said circuitry activates a visually discernible signal when said timer functionality reaches a predetermined countdown point.

28. A control system according to claim 23, wherein a third mode of contact with respect to said touch activated surface causes said circuitry to operate said timer functionality.

29. A control system according to claim 28, wherein said third mode of contact comprises longer duration contact with said touch activated surface than the longer of said first and second modes of contact.

30. A control system according to claim 29, wherein said first, second and third modes of contact are differentiated from each other based on duration of contact with said touch activated surface.

31. A control system for use with an electrical device adapted to operate at variable intensity, comprising:
  a. a housing defining an enclosure;
  b. circuitry mounted within said enclosure, said circuitry including switching functionality adapted to control power supply to said electrical device and timer functionality adapted to provide a countdown cycle for said electrical device;
  c. a touch activated surface associated with said housing and in communication with said circuitry;
  wherein said switching functionality and initiation of said timer functionality are controlled solely through interaction with said touch activated surface.

32. A control system according to claim 31, wherein said switching functionality, said timer functionality, and said variable intensity of said electrical device are controlled solely through contacts with said touch activated surface of varying duration and sequence.

33. A control system according to claim 31, wherein sequential contact with said touch activated surface causes said switching functionality to alternately increase and decrease power supply to said electrical device.

34. A control system according to claim 16, wherein said timer functionality is controlled by maintaining contact with said touch activated surface for a duration longer than that required to achieve maximum intensity for said electrical device.

35. A control system according to claim 31, wherein said switching functionality is adapted to control: (i) on/off functionality of said electrical device, and (ii) said variable intensity of said electrical device.

36. A control system according to claim 35, wherein said switching functionality controls said on/off functionality of said electrical device to turn on said electrical device over a predetermined period of time.

37. A control system according to claim 36, wherein, subsequent to turning on said electrical device, said switching functionality controls said on/off functionality of said electrical device to turn off said electrical device over a predetermined period of time.

38. A control system according to claim 35, wherein said on/off functionality is controlled solely through short duration contact with said touch activated surface, and wherein said variable intensity is controlled solely through contact with said touch activated surface of longer duration than said short duration contact.

* * * * *